(12) United States Patent
Balan et al.

(10) Patent No.: US 12,066,922 B2
(45) Date of Patent: Aug. 20, 2024

(54) SYSTEM AND METHODS FOR DEPLOYING A DISTRIBUTED ARCHITECTURE SYSTEM

(71) Applicant: Walmart Apollo, LLC, Bentonville, AR (US)

(72) Inventors: Sapna Balan, Bangalore (IN); Pradeep Sekhar, Bangalore (IN); Dileep Kumar Gidwani, Bangalore (IN); Deepak Tiwari, Bangalore (IN); Manoj Kumar Chowdhury, Durgapur (IN)

(73) Assignee: WALMART APOLLO, LLC, Bentonville, AR (US)

( * ) Notice: Subject to any disclaimer, the term of this patent is extended or adjusted under 35 U.S.C. 154(b) by 336 days.

(21) Appl. No.: 17/406,883

(22) Filed: Aug. 19, 2021

(65) Prior Publication Data
US 2022/0334950 A1    Oct. 20, 2022

(30) Foreign Application Priority Data

Apr. 19, 2021  (IN) .............................. 202141017999

(51) Int. Cl.
G06F 11/36    (2006.01)
(52) U.S. Cl.
CPC ........ G06F 11/368 (2013.01); G06F 11/3612 (2013.01); G06F 11/3684 (2013.01);
(Continued)
(58) Field of Classification Search
CPC .............. G06F 11/368; G06F 11/3612; G06F 11/3684; G06F 11/3688; G06F 11/3692; G06F 2201/84
See application file for complete search history.

(56) References Cited

U.S. PATENT DOCUMENTS 9,880,837 B2    1/2018  Khazanachi et al.
10,474,665 B2   11/2019 Jadhav et al.
(Continued)

OTHER PUBLICATIONS

Novakouski, Marc, et al. "Best practices for artifact versioning in service-oriented systems." Software Engineering Institute, Carnegie Mellon University, Pittsburgh, Pennsylvania, Technical Note CMU/SEI-2011-TN-009 (2012). (Year: 2012).*
(Continued)

*Primary Examiner* — Kevin L Young
*Assistant Examiner* — Joanne G Macasiano
(74) *Attorney, Agent, or Firm* — BRYAN CAVE LEIGHTON PAISNER LLP

(57) ABSTRACT

A system including one or more processors and one or more non-transitory computer-readable media storing computing instructions configured to run on the one or more processors and perform: onboarding data received from one or more entities to create a version of an artifact of a first distributed architecture; periodically running one or more test cases using the version of the artifact in an environment; detecting a modification to the version of the artifact; automatically generating a modified version of the artifact incorporating the modification; selecting a first artifact from the list of one or more artifacts associated with the first distributed architecture, wherein the first artifact comprises an internet protocol (IP) address; deploying the first artifact, by using the IP address, into a networking sandbox to implement changes to the first artifact corresponding to a particular objective; and building a second artifact. Other embodiments are disclosed.

20 Claims, 6 Drawing Sheets

(52) U.S. Cl.
CPC ...... *G06F 11/3688* (2013.01); *G06F 11/3692* (2013.01); *G06F 2201/84* (2013.01)

(56) References Cited

U.S. PATENT DOCUMENTS

| | | | |
|---|---|---|---|
| 10,613,970 B1* | 4/2020 | Jammula | G06F 11/3688 |
| 10,698,733 B1* | 6/2020 | Lee | G06F 9/44505 |
| 11,829,280 B1* | 11/2023 | Zhang | G06F 11/3684 |
| 2008/0256506 A1* | 10/2008 | Chaar | G06F 8/36 |
| | | | 717/101 |
| 2011/0167042 A1* | 7/2011 | Moore, Jr. | G06F 11/3684 |
| | | | 707/638 |
| 2013/0263080 A1* | 10/2013 | Karnik | G06F 8/35 |
| | | | 717/104 |
| 2015/0127618 A1* | 5/2015 | Alberti | G06F 16/128 |
| | | | 707/678 |
| 2017/0243146 A1* | 8/2017 | Aerdts | G06Q 10/067 |
| 2018/0173525 A1* | 6/2018 | Suparna | G06F 8/77 |
| 2020/0371782 A1* | 11/2020 | Baierlein | G06F 11/3608 |
| 2023/0168874 A1* | 6/2023 | Makhija | G06F 9/451 |
| | | | 719/320 |

OTHER PUBLICATIONS

Scherer, Daniel. "A distributed framework for integrated software process and deployment support." TIK Report 52 (1998). (Year: 1998).*

* cited by examiner

SYSTEM AND METHODS FOR DEPLOYING A DISTRIBUTED ARCHITECTURE SYSTEM

CROSS-REFERENCE TO RELATED APPLICATIONS

This application claims priority to India Patent Application No. 202141017999, filed with the Indian Patent Office on Apr. 19, 2021. India Patent Application No. 202141017999, is incorporated herein by reference in its entirety.

TECHNICAL FIELD

This disclosure generally relates to deploying a distributed architecture system.

BACKGROUND

Once in production, distributed architecture system documentation can become outdated due to the complexities of accurately identifying whether the current documentation of the current architecture is out-of-date.

BRIEF DESCRIPTION OF THE DRAWINGS

To facilitate further description of the embodiments, the following drawings are provided in which.

Figure 1:
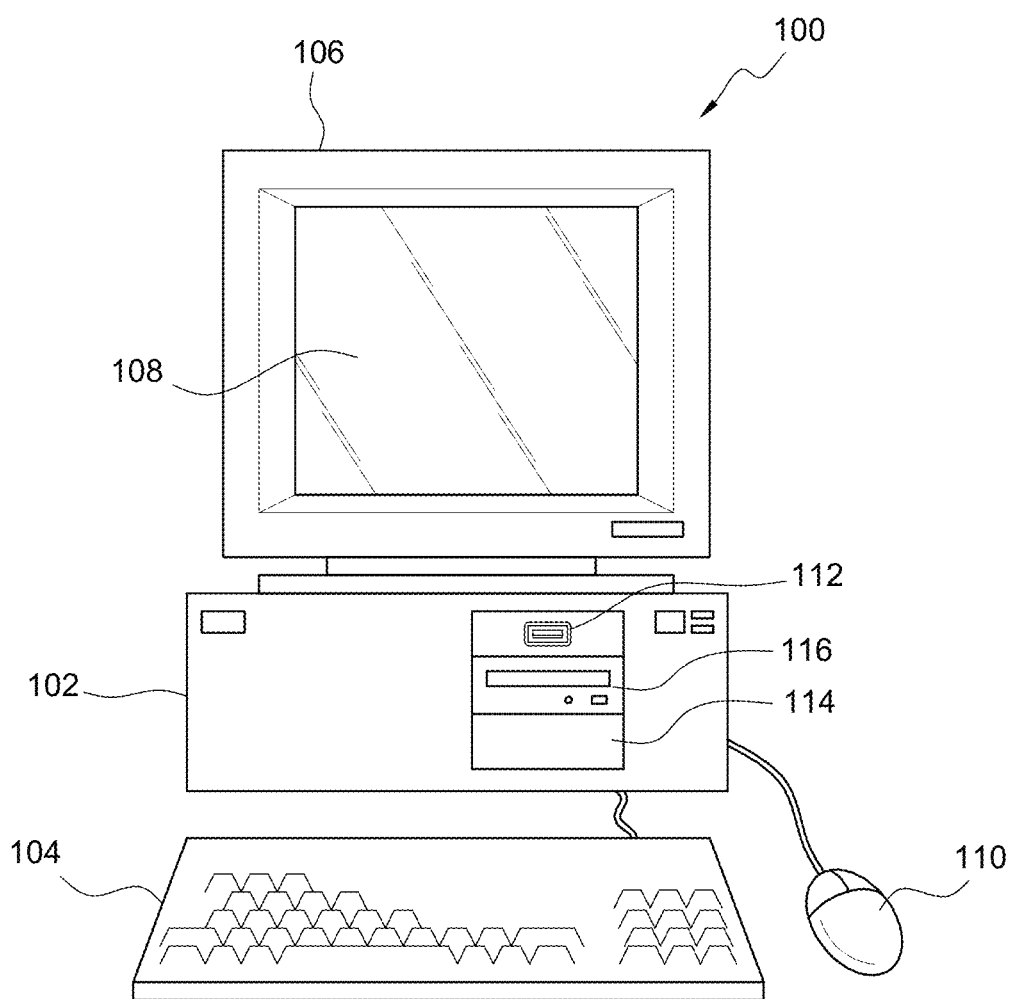
FIG. 1 illustrates a front elevational view of a computer system, according to an embodiment, that is suitable for implementing an embodiment of the system disclosed in FIG. 3 and embodiments of the flow charts disclosed in FIGS. 4, 5, and 6.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EMBODIMENTS

Figure 2:
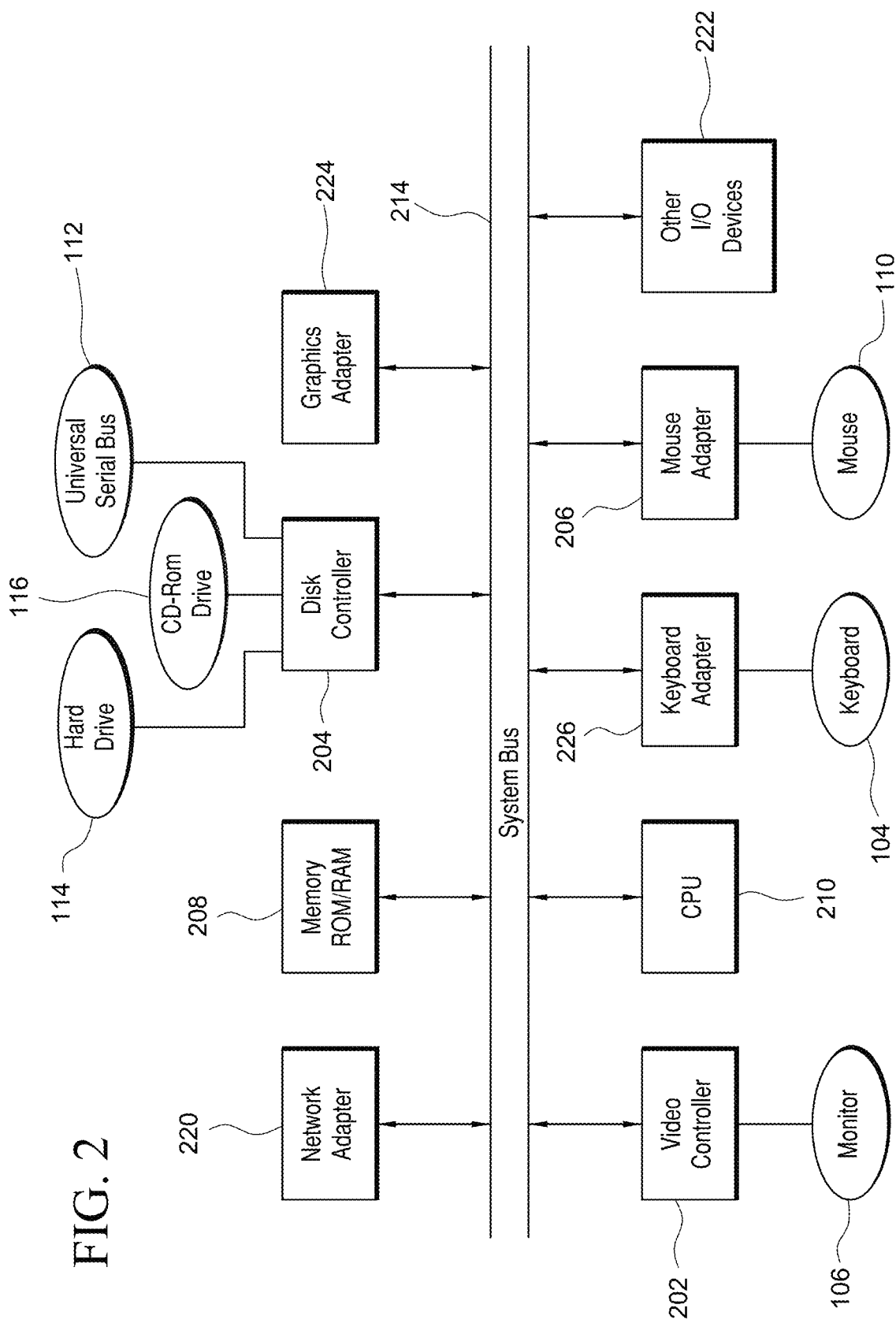
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
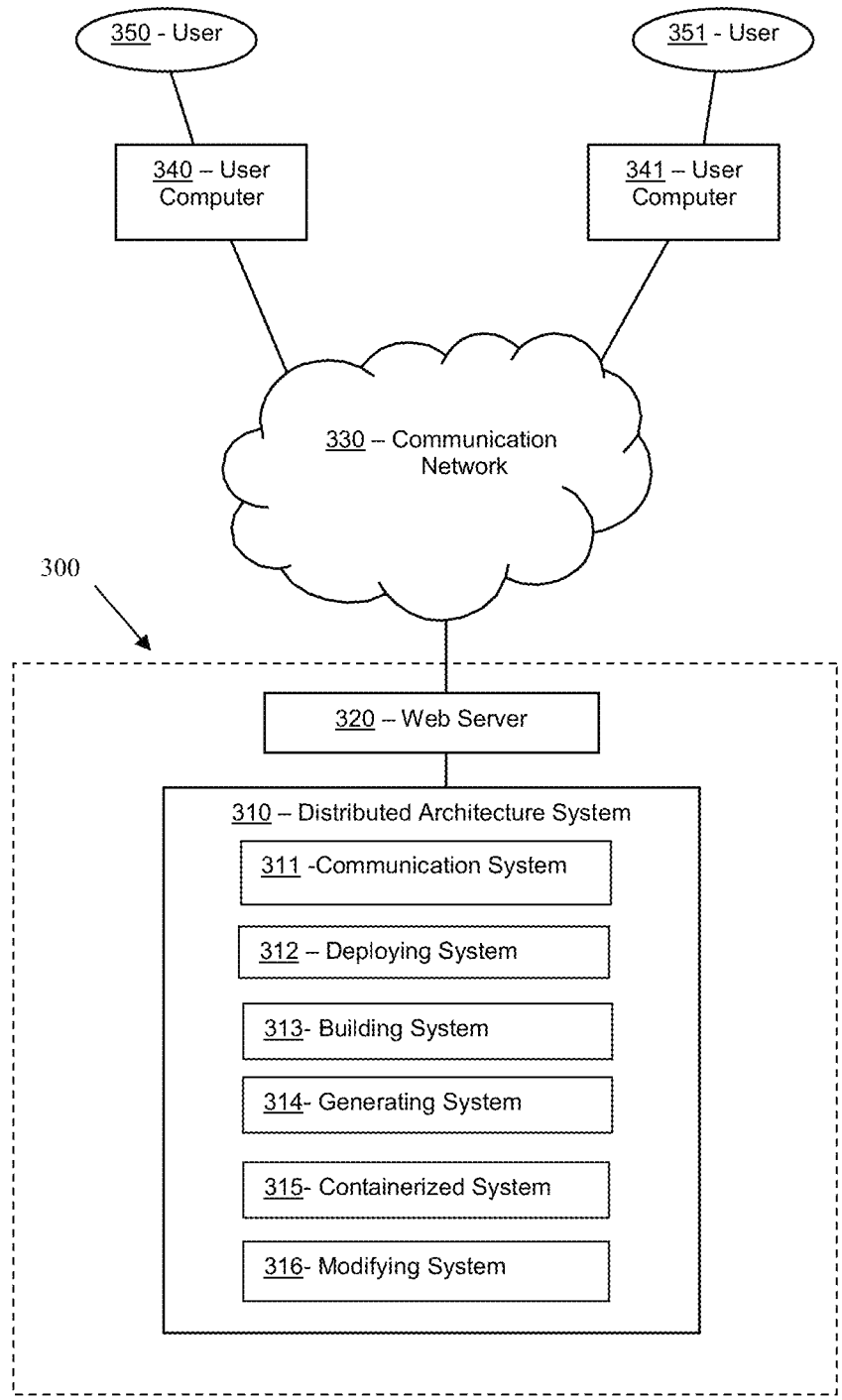
FIG. 3 illustrates a block diagram of a system that can be employed for deploying an artifact into a networking sandbox, according to an embodiment.

Turning ahead in the drawings, FIG. 3 illustrates a block diagram of a system 300 that can be employed for automatically creating a blueprint of an artifact of a distributed architecture system. System 300 can also be employed for automatically updating the artifact on a periodic basis by monitoring a continuous integration (CI) pipeline. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, system 300 can include a distributed architecture system 310 and/or a web server 320. Distributed architecture system 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host two or more of, or all of, distributed architecture system 310 and/or web server 320. Additional details regarding distributed architecture system 310 and/or web server 320 are described herein.

In a number of embodiments, distributed architecture system 310 can be a special-purpose computer programed specifically to perform specific functions not associated with a general-purpose computer, as described in greater detail below. In other embodiments, distributed architecture system 310 can be a general-purpose computer.

In some embodiments, distributed architecture system 310 and/or web server 320 can be in data communication through a communication network 330 with one or more user computers, such as user computers 340 and/or 341. Communication network 330 can be a public network, a private network or a hybrid network. In some embodiments, user computers 340-341 can be used by users, such as users 350 and 351, which also can be referred to as customers (e.i., architects, developers, testers, and other suitable users) in which case, user computers 340 and 341 can be referred to as customer computers. In many embodiments, web server 320 can host one or more sites (e.g., websites) that allow users to browse and/or search for items (e.g., products), to add items to an electronic shopping cart, and/or to order (e.g., purchase) items, in addition to other suitable activities.

In some embodiments, an internal network that is not open to the public can be used for communications between distributed architecture system 310 and/or web server 320 within system 300. Accordingly, in some embodiments, distributed architecture system 310 (and/or the software used by such systems) can refer to a back end of system 300, which can be operated by an operator and/or administrator of system 300, and web server 320 (and/or the software used by such system) can refer to a front end of system 300, and can be accessed and/or used by one or more users, such as users 350-351, using user computers 340-341, respectively. In these or other embodiments, the operator and/or administrator of system 300 can manage system 300, the processor (s) of system 300, and/or the memory storage unit(s) of system 300 using the input device(s) and/or display device (s) of system 300.

In certain embodiments, user computers 340-341 can be desktop computers, laptop computers, a mobile device, and/or other endpoint devices used by one or more users 350 and 351, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

In some embodiments, communication network 330 can be an internal network that is not open to the public, which can be used for communications between distributed architecture system 310 and/or web server 320. In other embodiments, communication network 330 can be a public network, such as the Internet. In several embodiments, operators and/or administrators of system 300 can manage system 300, the processor(s) of system 300, and/or the memory storage unit(s) of system 300 using the input device(s) and/or display device(s) of system 300, or portions thereof in each case.

In several embodiments, distributed architecture system 310 can include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to distributed architecture system 310 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of distributed architecture system 310. In a similar manner, the processors and/or the non-transitory computer-readable media can be local and/or remote to each other.

Meanwhile, in many embodiments distributed architecture system 310 also can be configured to communicate with and/or include one or more databases. The one or more databases can include a database that contains information (including documentation) about system architectures, for example, among other data as described herein in further detail. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between distributed architecture system 310, web server 320, and/or the one or more databases can be implemented using any suitable manner of wired and/or wireless communication. Accordingly, distributed architecture system 310 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, distributed architecture system 310 can include a communication system 311, a deploying system 312, a building system 313, a generating system 314, a containerized system 315, and/or a modifying system 316. In many embodiments, the systems of distributed architecture system 310 can be modules of computing instructions (e.g., software modules) stored at non-transitory computer readable media that operate on one or more processors. In other embodiments, the systems of distributed architecture system 310 can be implemented in hardware.

Figure 4:
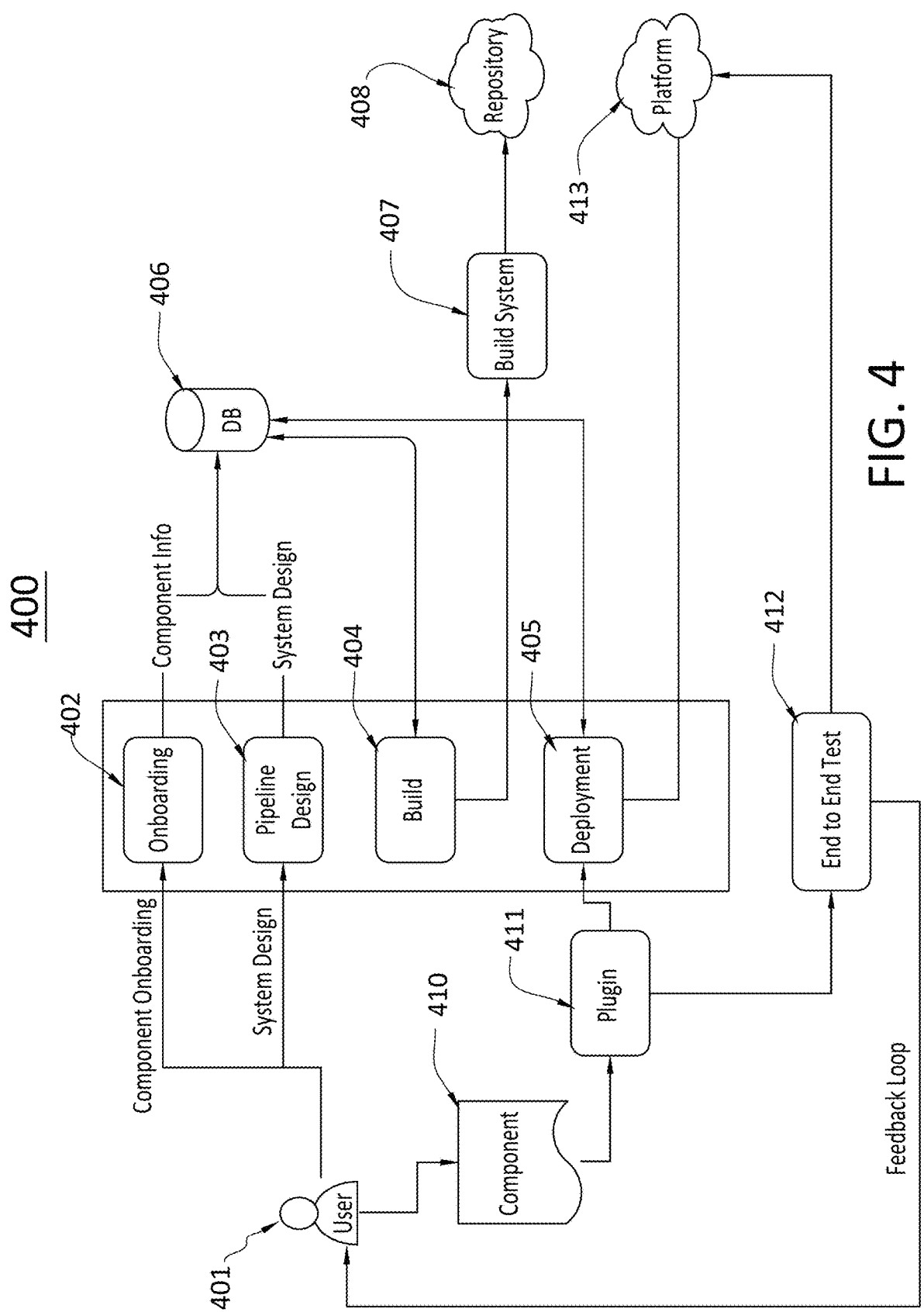
FIG. 4 illustrates a flow chart of a method, according to an embodiment.

Turning to the drawings, FIG. 4 illustrates a flow chart for a method 400 of automatically building a current version of a blueprint of an artifact for a distributed architecture system based on multiple containerized binary files corresponding to multiple entities, according to an embodiment. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped. In many embodiments, method 400 can be implemented by distributed architecture system 310 (FIG. 3).

Generally, there is no simple or easy way for an architect or developer to deploy a function from scratch due to the complexities of configuring such a system including tracking multiple components and conducting several iterations of validation testing layers. For example, deploying a single new function can often include months of planning. The process can begin with identifying each of the components of the system that can then be instantiated. Further, the process collects various configurations, schemas, and other components. Deploying a function can include running iterations of tests to validate each version to ensure that the right versions are selected to be used. In following with this example, next the architect configures infrastructure of the function to support the deployment of the function. Typically, a new deployment of a function can be configured for multiple functions, such as but not limited to: end to end testing of new features, workload segregation, chaos testing, training/learning features, destructive/negative testing, and/or another suitable function. Further, a deployment often can be dependent upon gathering a collective amount of information scattered across locations in various systems.

Conventionally, architects tasked with building a distributed architecture diagram for an entity relied largely on manual processes and/or techniques. The architect often relied on several teams associated with an entity using various workspaces and word documents. Architects and developers worked with teams to manually capture architecture diagrams and relied on the teams to manually update each of the architecture diagrams.

In some embodiments, method 400 can include a novel methods of discovery of schema, topology, configuration, dependency resolution, and/or packaging the data as one unit along with the binaries (e.g., containerized binary files). Such a unit can be (1) version controlled and/or (2) auto synchronized.

In various embodiments, method 400 can include designing a distributed architectural system to implement a particular objective of a process, a function, a design, and/or another suitable distributed system. In some embodiments, architecture systems can be frequently updated using one or more incremental releases while the system is in production. In many embodiments, incremental releases can add new functionalities and/or modifications in smaller increments to a current version of an architecture system. In some embodiments, using continuous integration (CI) and/or continuous deployment (CD) techniques can implement incremental releases.

In some embodiments, method 400 also can be divided into distinct processes including an onboarding process, a design process, a build process, a deployment process, and/or another suitable process associated with creating a distributed architectural system, as discussed in greater detail below in FIG. 5.

In several embodiments, method 400 can include a block 401 of collecting data from one or more applications associated with a process or a function. For example, an architect can design an end-to-end system by selecting applications to perform certain processes in conjunction with each other. A single system out of multiple systems can run many applications concurrently and/or consecutively when implementing each process. For example, in many embodiments, a system can use a number of applications. The number of applications can be more than 30, 40, 100, and/or another suitable number of applications dependent on the complexity of the system.

In many embodiments, one or more teams from each entity can be responsible for developing and updating each application of multiple applications. Such exemplary applications can include a system information application, a database of system information, a queue system of information, and/or other suitable applications. For example, an exemplary process for an order management system for a purchase of an item. The exemplary process can receive an order for the item, process payment for the item, and schedule shipment of the order to a user. Individual services can include an order service, a payment service, and a shipment service, as shown below:

Order Service→Payment Service→Shipment Service

In some embodiments, block 401 of receiving instructions from with a graphical user interface to build and use an artifact of a system. In many embodiments, instructions from the graphical user interface from an architect and/or a developer can include initiating component onboarding, a system design, setting up automatic incremental release schedules, such as a continuous integration (CI) system or a continuous deployment (CD) system, receiving feedback when an artifact is not up-to-date, and/or another suitable activity. In several embodiments, method 400 can proceed after block 401 to a block 402 and a block 403.

In many embodiments, each entity of multiple entities can develop and independently own multiple types of architecture diagrams, architecture design diagrams, and/or architecture systems specific to objectives of that entity. As an example, an objective of an entity can be described as follows. An ordering system can receive an order and validate the order before saving it to the database. The order system can inform the payment service about the order via a queue, which triggers the payment process. On a successful completion of the payment process, the payment service can trigger the shipment service to schedule the order delivery via a scheduling queue. The information of the process can be stored in a database. Other examples of objectives can include reading the information and adding the information to a queue for consumption by other entities, validation of data inputs, transformation the data, and/or other suitable objectives. In some embodiments, each entity further can be responsible for modifying or updating portions of a version of the architecture system which can be a separate and/or discrete process employed by each entity, as described in greater detail below in connection with block 412 and/or block 502 (FIG. 5).

In some embodiments, method 400 can include capturing an end-to-end architectural blueprint of multiple microservices of a function using an integrated platform. An example of a microservice can include a seller service, a product service, and/or a rules service. A seller service can receive catalog data, validate the data, and store the data in the database. A product service can run a machine learning model to clean and classify the catalog data. A rules service can include rules and metrics that are applied for the product in the catalog before it is displayed to the customer. Other examples of microservices can include storing catalog data, serving catalog data, applying business rules, and running machine learning models. In several embodiments, each microservice can be converted to binary files where the data for each microservice can be persistent across multiple container runs. In various embodiments, such binary files can be dynamically containerized and replicated within a minute, two minutes, or another suitable period by using one or more optimal resources, as described further below in connection with block 402.

In some embodiments, method 400 can include a block 402 of collecting data from applications, which can include one or more components. In several embodiments, the components can include microservices, databases, message brokers, caches, and/or another suitable component of an application. In some embodiments, the onboarding process can refer to collecting data from the one or more components of each of the applications, where the components can be represented by containerized binary files. In several embodiments, the system can containerize the build artifacts and/or binary files using docker images along with the operating system (OS), runtime binaries, and configuration. (A docker image is an immutable or unchangeable file that contains binaries, libraries, dependencies, tools, and other files needed for an application to run.) If the build artifact is docker image previously produced by a team, the docker image is reused without any modification. In some embodiments, method 400 can proceed after block 402 to a block 406.

In many embodiments, the system allows the architecture of a function to be discovered as a first step in building the artifact. As an example, Step 1 for Discover and Step 2 for Design can include:

Step 1: Discover. Onboard individual service information about the binary version, a configuration, and other data for the service. If a service is not containerized, the system automatically creates a docker image.

In a number of embodiments, method 400 can include a block 403 of designing a system. In several embodiments, the design process can refer to using a pipeline design to create an artifact for a particular function or process. For example, Step 2 for Design:

Step 2: Design. Create the order management system design, as described above in block 402, using a graphical user interface. In this example, this is the blueprint. Such a graphical user interface can include using a Vajra User Interface (UI).

In some embodiments, block 403 further can defining a function or service by using a graphical user interface of a computing device. For example, Step 3 for Build can include:

Step 3: Build. Create snapshots (e.g., blueprints) of the system design with current artifact metadata version and configuration, where such configuration can include IP addresses and domain Name systems (DNS): Order Service v.1→Payment Service v.2→Shipment Service v.1

In many embodiments, each snapshot or blueprint taken of a build design captures a moment in time of certain application versions in the snapshot at that moment, including the IP address for that moment. In some embodiments, a snapshot taken of the build design can represent the applications running in a production environment. In the example above for Step 3, order service v. 1 and shipment service v.1 have not been modified by either an incremental release and/or another suitable update as indicated by the notation v. 1 representing an original version of the application, wherein payment service v. 2 received a modification as indicated by the notation v. 2 representing a newer version of the application. In some embodiments, the IP address copied in the snapshot will retrieve all versions of the applications as of the date of the snapshot. In several embodiments, method 400 can proceed after both block 402 and a block 403 to block 406. In some embodiments, an advantage of storing component information from block 402 and system design information from block 403 in block 406 can allow block 404 and block 405 access to blueprints and/or build artifacts.

In various embodiments, method 400 further can include a block 404 of building the artifact, which can include component information and system designs stored in block 406. In some embodiments, the build process can refer to (i) creating optimized build artifacts and (ii) building snapshots or blueprints of a distributed architectural system. In many embodiments, a template for the end-to-end system design can include applications and dependencies. In several embodiments, optimizing the build artifacts can include consolidating applications that can perform the same dependency, such as a database application. For example, a template includes an application #1, a database #1, an application #2, and a database #2. By optimizing applications such as database #1 and #2, the template can become more robust and efficient consolidating applications, thus after optimization, the template includes an application #1, a database #1, and an application #2, where database #2 was merged into database #1.

In some embodiments, block 404 can retrieve multiple artifacts discovered among multiple entities and/or different entities (e.g., unrelated). Such entities can be located and/or scattered across multiple different platforms where one or more of the different platforms can be owned by one or more different entities. In some embodiments, an advantage of storing blueprints (e.g., snapshots of system designs) or build artifacts from block 404 in block 406, can allow retrieval of all applications to deployment 405 by using the same IP address copied in the snapshot.

In various embodiments, block 404 also can provide a mechanism to visually drag and drop each of the onboarded microservices into an integrated platform to create a blueprint of the architecture system, where each blueprint captures particular processes or functions associated with an entity. In many embodiments, each of containerized binary files of each blueprint can be version controlled, where the architecture system can record changes to the containerized binary files over time. Such changes can include modifications in the incremental releases. In some embodiments, each version of a blueprint can include a design and an individual system information. In several embodiments, applications running in virtual machines (VMs) can be automatically containerized.

In several embodiments, block 404 can include reusing existing network configurations, such as IP addresses or a hostname, for the service in a production environment can be advantageous when used to dynamically configure service entries in a portable, extensible, open-source platform. In some embodiments, the portable extensible, open-source platform can be used to manage containerized workloads that can be used by an open-source mesh technology to route between the containerized services. Such platforms can include a Kubernetes namespace or Istio.

In several embodiments, block 404 can include optimizing the system resource requirements that can be advantageous by (i) consolidating and grouping shared resources like data sources (e.g., Kafka, Cassandra, RDBMS) across multiple systems for a process and (ii) routing the application traffic to the respective dependent data sources without any or minimal additional configuration. In many embodiments, method 400 can proceed after block 404 to a block 406 and/or a block 407.

In several embodiments, method 400 can include a block 405 of deploying a selected artifact. In many embodiments, the deployment process can refer to (i) creating deployment resources based on a snapshot (e.g., blueprint) and build information, and (ii) creating dynamic network configurations based on end-to-end system designs. In several embodiments, method 400 can deploy a group of microservices and the supporting ecosystem as defined in the blueprint to a previously provisioned computer on the cloud (e.g, cloud services).

In some embodiments, block 405 can reuse production and/or stage configurations of a blueprint that requires no separate configuration of IP addresses, naming, and/or other suitable systems.

In various embodiments, block 405 can create a networking sandbox environment (e.g., a secluded environment) that provides a layer of cybersecurity using an isolated environment on a network to mimic end-user operating environments. In several embodiments, using the sandbox environment to execute code reduces a risk of harm from cyber threats on a host device. For example, by using the networking sandbox confidential data and/or context of IP addresses, naming and name spaces can remain isolated within a provisioned name space.

In some embodiments, block 405 can configure the CI pipeline and/or the CD pipeline to deploy only after each of the artifacts have been tested by using the integrated platform. In various embodiments, deploying the artifacts that have been tested can force developers and/or testers to periodically update all changes to an artifact and/or to onboard new components to the integrated platform. In several embodiments, block 405 can be advantageous by maintaining each artifact as updated as of a certain date of the artifact. In some embodiments, by configuring the CI pipeline and/or the CD pipeline to deploy after each of the artifacts have been tested can avoid or eliminate using a separate step to update the architecture documents. In some embodiments, method 400 can proceed after block 405 to a block 406 and/or a block 413.

In many embodiments, method 400 can include a block 406 of storing data used to build an artifact.

In several embodiments, method 400 can provide a mechanism by which each individual microservice can onboard the architecture system, a configuration, a supporting schema, a database, message brokers, stream processing, and other suitable microservices, on to an integrated platform that can then be persisted. In various embodiments, method 400 additionally can include a block 406 of storing artifacts in a database.

In many embodiments, method 400 can include a block 407 of receiving system designs using a build system to build artifacts for storage. Method 400 can proceed after block 407 to block 408. In several embodiments, a build system can build binaries (e.g., containerized binary files) and store the binaries in the repository. In some embodiments, upon receiving information from one or more microservices, the system can trigger (e.g., initiate) the build system to create or build artifacts.

In some embodiments, method 400 can include a block 408 of storing artifacts in a repository. For example, the build system builds artifacts like docker images to be stored in the repository.

In various embodiments, method 400 can keep in synchronization one or more of the build artifacts to a latest production version. In some embodiments, the files produced by a build configuration for the artifact can specify paths to the artifacts so each deployment can be based on data from the latest production version of the artifact. For example, each build (e.g., deployment artifact) can include either a single binary application code or a group of compressed files stored in an archive, wherein build is the application code as it runs on production.

In several embodiments, method 400 can include a block 410 of onboarding modified components from an incremental release. For example, a set of rules of Step 4 can include an exemplary rule for Developer, such as:

Step4: Developer in the order service release V2. This automatically triggers the test plugin to create with version v2, such a test plugin can be similar or identical to plugin block 411.

In some embodiments, method 400 can include a block 411 of triggering a plug in. In several embodiments, method 400 can proceed after block 411 to a block 405 and/or a block 412. For example, Step 5 for test plugin, can include:

Step 5: Test plugin triggers the optimized blueprint from Step 3 for deployment in an integrated platform replacing Order Service v1 to Order service V2. Such an intergrated platform can include Kubernetes.

Order Services v2→Payment Service v.2→Shipment Service v.1

In some embodiments, Step 5 can be executed by a test plugin, which can retrieve (i) the input about the Order Services v.1 (e.g., a microservice) that is releasing a new version of the service (e.g., Order Services v.2) and (ii) the functional process against which the new version of the service is to be tested. In various embodiments, a test plugin can be similar or identical to the plugin of block 411. In many embodiments, the system initially calls block 405 to deploy a latest function process design with the new version of the service requested for testing. Step 5a waits for the deployment and execution of Step 6a+Step 6b to complete and then can trigger the end to end test execution, such as the end to end test block 412.

Step 5 can include Step 5a (as explained above) and a Step 5b of additional test plugins that can call block 405 to deploy the latest order management blueprint with the Order Service v2:

Order Service v2→Payment Service v.2→Shipment Service v.1

As a further example, Step 6 for validation of whether the current version is up-to-date can include:

Step 6: Test plugin waits for the step 5 to complete and then triggers the end to end test cases validating the order management business process against the new deployment with version v2.

In several embodiments, method 400 can include an advantage as shown when the method automatically updates each distributed architecture system by periodically running a present or current version to detect modifications added by the frequent incremental releases. Such an advantage can ensure that a user is retrieving the latest version of the artifact including all new functionalities from each recent incremental release before a date the present version is retrieved or selected. Often, each team of an entity can be solely responsible for maintaining each architecture system corresponding to that team and/or entity, thus an overall architecture system for each entity usually is non-existent for a particular function.

In some embodiments, method 400 includes a block 412 of running end-to end testing to track each entity, using a synchronization engine, to identify respective changes implemented by each entity to another version of the artifact. In several embodiments, block 412 can determine whether a current version is up-to-date using a binary score system. In some embodiments, the binary score system uses assertions to validate the system behavior under testing using (i) predetermined (e.g., specified) acceptance criteria and (ii) individual system health checks. In various embodiments, a failure scenario during the testing can indicate a probability that the system with the new version is breaking the system due to a new design (e.g., modification) or bug detected in the new version. In many embodiments, the binary scoring system can output a binary score of 1 or 0. In some embodiments, a binary score of 1 can indicate that the current version is up-to-date, where a binary score of 0 can indicate that the current version is not-up-to-date. In many embodiments, block 412 can include (i) feedback on whether the test case is successful with a new version, such as a version 2, and (ii) can testify that the new version can be released to production and the same can be updated in the system as a new version updating the blueprint.

In various embodiments, block 412 also can detect changes from (i) each version of each containerized binary file of the one or more containerized binary files and (ii) binary tags associated with a respective entity of the one or more entities. In some embodiments, changes received from incremental releases can modify a newer version of one of the applications in the system, where other applications in the system are not modified by the same incremental release. In several embodiments, method 400 can proceed after block 412 to a block 413 and/or a block 401 via a feedback loop.

In several embodiments, method 400 includes a block 413 of building a second artifact based on the changes implemented to the first artifact, where the first artifact is the current version.

Figure 5:
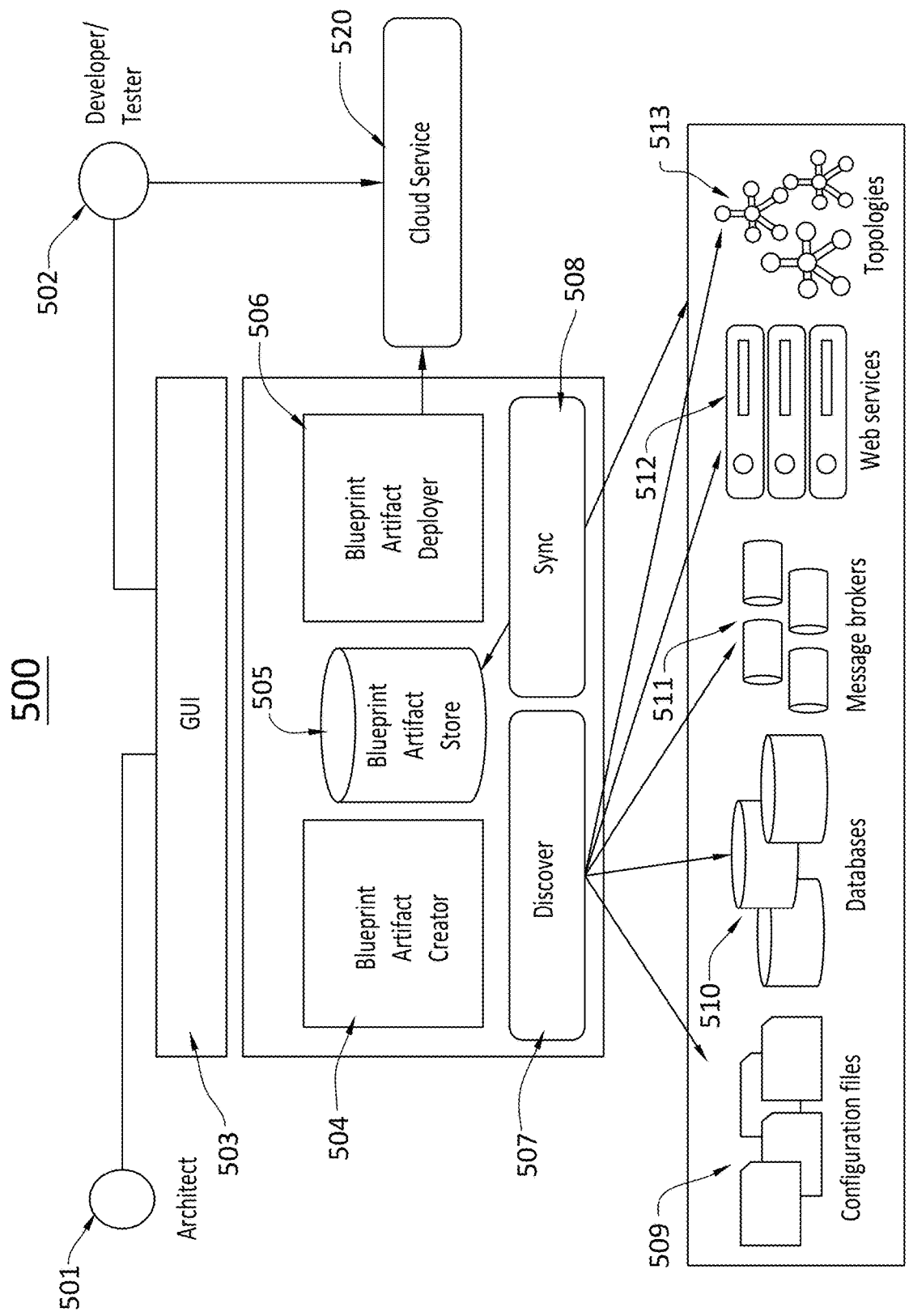
FIG. 5 illustrates a flow chart of a method, according to another embodiment.

In the drawings, FIG. 5 illustrates a flow chart for a method 500 of automatically building a current version of a blueprint of an artifact for a distributed architecture system based on multiple containerized binary files corresponding to multiple entities, according to an embodiment. Method 500 is merely exemplary and is not limited to the embodiments presented herein. Method 500 can be employed in many different embodiments or examples not specifically depicted or described herein. In some embodiments, the procedures, the processes, and/or the activities of method 500 can be performed in the order presented. In other embodiments, the procedures, the processes, and/or the activities of method 500 can be performed in any suitable order. In still other embodiments, one or more of the procedures, the processes, and/or the activities of method 500 can be combined or skipped. In many embodiments, method 500 can be implemented by distributed architecture system 310 (FIG. 3).

In some embodiments, method 500 can provide a way for the architecture of a business function to be discovered, kept current, and then deployed to a cloud service to be used for testing. Method 500 can include different users (e.g., personas) such as an Architect and/or a Developer/Tester. Method 500 further can be described as (i) Discovery and (ii) Sync, as described further in conjunction with block 507 and block 508 below.

In several embodiments, method 500 can include a block 501 of defining a service. Block 501 can be similar or identical to the activities described in block 401 (FIG. 4). In many embodiments, the architect and/or another suitable user can define the architecture using the graphical user interface (GUI). In several embodiments, the architect can use the GUI to identify a list of components used to serve up a function, such as micro services, databases, message brokers, stream processors, and other suitable components. In many embodiments, the architect can provide the location (e.g., IP address), user credentials, location of configuration files for each service (e.g., a micro service, a database, a message broker). In some embodiments, method 500 can proceed after block 501 to block 503.

In some embodiments, a developer or tester can access the GUI and view the list of artifacts available for deployment, similar to a pull down menu on a webpage. In many embodiments, the developer or tester can select or choose the artifact from the GUI. In several embodiments, the developer or tester also can provide the location, namespace, and access credentials of the cloud service for the function of the architecture.

In some embodiments, method 500 can include a block 502 of testing a service. In several embodiments, a developer or a tester can need access to a test environment that has the full functionality deployed to test new or changed features end-to-end. In various embodiments, block 502 can be similar or identical to the activities described in block 401, block 410, block 411, and block 412 (FIG. 4). In many embodiments, the developer or tester accesses the GUI and to view the list of artifacts available to deployed.

In various embodiments, block 502 of testing a service can allow the developer or tester to choose the artifact to be tested before being stored into a cloud service. In several embodiments, the developer or tester can provide the location, namespace, and access credentials of the cloud service used to deploy the artifact using the end points and to conduct the testing. In some embodiments, the developer or tester can access the process deployed in the namespace for debugging or further testing. In various embodiments, once the testing or debugging is completed, the system can delete the deployed services. In some embodiments, deleting the deployed services can be advantageous by saving a cost previously encountered for services for computing needs that can be based on a pay per usage model, such services can include the cloud services. In various embodiments, deleting the deployed services returns back the computer resources used by the cloud provider without further charges. In various embodiments, block 503 can be similar or identical to the activities described in block 404 (FIG. 4). In several embodiments, once testing is over, the developer or tester can use the GUI to clean up the deployment by accessing the namespace and shutdown all services. In several embodiments, method 500 can proceed after block 502 to block 520.

In various embodiments, method 500 also can include a block 503 of using a graphical user interface to define the architecture. In some embodiments block 503 can be similar or identical to the activities described in block 401 (FIG. 4).

In a number of embodiments, method 500 can include a block 504 of creating a blueprint of the architecture. In many embodiments, block 504 can be similar or identical to the activities described in block 404 (FIG. 4). In several embodiments, block 504 can use the discovered data from block 507 to (a) create a blueprint (e.g., artifact) with all the discovered details (including the location of the containerized binary files to be deployed) and (b) store the blueprint in block 505. In many embodiments, block 504 can containerize a binary file if the binary file is not already containerized, as described further in conjunction with blocks 402-404 (FIG. 4).

In many embodiments, block 504 can perform optimization on the data sources, such as databases and messaging systems, based on the blueprint. In many embodiments, block 504 can be similar or identical to the activities described in block 403 and 404 (FIG. 4). For example, if the blueprint has a product service using a MySql database and an Order service Mysql database, the a deployment module brings up only one MySql database with corresponding schema and routes both the application traffic to the single database. Additionally, the system can add additional network configuration to conduct the optimization of the two database applications. In following the previous example, the product service can be configured for product.database.com to connect to the product MySQL database. The order service can be configured for order.database.com to connect to order MySQL database. By leveraging the open source platforms, such as Kubernetes and Istio mesh, the system can configure the network such a way that Order Service and Product service connect to the one single MySql database transparently without making any changes to application artifacts or its configuration. In some embodiments, method 500 can proceed after block 504 to block 505.

In many embodiments, method 500 can include a block 505 of storing a blueprint in a repository. In several embodiments, block 505 can be similar or identical to the activities described in block 404 (FIG. 4). In some embodiments, the system stores meta data about the artifacts such as a name, a tag, a version, and/or another suitable meta data. In various embodiments, the system keep track of updates to the artifact meta data when the micro service developer teams incrementally releases new versions to production. In several embodiments, the older artifacts can be version controlled and continue to be stored in a Blueprint Artifact store, such as the store similar or identical to the store in block 505. In some embodiments, for testing purposes, use cases can be tested when developers bring up the older versions of artifacts for testing purposes.

In some embodiments, block 505 can store the system design, artifact details, configurations, and/or another suitable data point of an artifact. In several embodiments, block 505 further can include storing metadata for the version of the artifact by tracking an update to the metadata generated from an incremental release of a newer version of the artifact associated with an entity of the one or more entities. In many embodiments, block 505 also can include using the metadata, as stored, of the version of the artifact to detect the modification to the version of the artifact.

In some embodiments, method 500 can include a block 506 of deploying a blueprint and IP address. In many embodiments, block 506 can be similar or identical to the activities described in block 405 (FIG. 4). In several embodiments, block 506, using a deployer module, can access the blueprint artifact store and retrieve the chosen artifact. In many embodiments, the deployer module can login to the cloud service and run validations to check for compute capacity, memory size and network configurations.

In several embodiments, conventional methods used by teams can include the teams independently bringing up each service. In the conventional method, the developer usually manually checked each service for compute capacity and memory size. In various embodiments, a deployer module can leverage the commands provided by container platform, such as Kubernetes (open source platform) to conduct the validations. In many embodiments, the deployer module also can update the network configurations of the namespace to create an isolated environment where the IP addresses referred to by the entities within the artifact can be locally routed within the namespace unless otherwise configured.

In various embodiments, the block 506, using the deployer module, can then orchestrate a startup of all the services listed in the artifact. In some embodiments, the system stores the health check end point for each service. After deployment, in several embodiments, the system tracks the health check end point until the system returns a success. In many embodiments, such a step can be advantageous to know that the blueprint deployment status for each service prior to starting any type of testing. For example, if any service is not yet started and the system starts performing some testing then the system might fail due to that service, thus the system waits until all services are retrieved. In some embodiments, the system can return a success to the GUI. In some embodiments, method 500 can proceed after block 506 to block 507.

In several embodiments, method 500 can include a block 507 of discovering historical artifacts. In many embodiments, block 507 can be similar or identical to the activities described in block 402 (FIG. 4). In some embodiments, block 507 can discover the components of applications outlined in configuration files 509, databases 510, message brokers 511, web services 512, and/or topologies 513, wherein components can be saved as containerized binary files. Blocks 509-513 can be similar or identical to the activities described in blocks 401-403 (FIG. 4).

In some embodiments, block 507, using a discover module, can connect to each entity listed for a service to discover the details of the application for the service, applications can include:
Application Binaries;
Web server configurations;
Application configuration files;
Database schema;
Message broker topics;
Topologies of the stream processor; and
Details of any other associated entities In various embodiments, method 500 can include a block 508 of synchronizing with the artifacts and the entities. In some embodiments, block 508 can be similar or identical to the activities described in block 412 (FIG. 4). In several embodiments, the system, using a synchronization engine (e.g., a Sync module), can track each entity of the artifact in the production environment for any changes. In various embodiments, a new version of the artifact can be created if any change is detected in any of the discovered entities. In some embodiments, the synchronization engine periodically (twice a day) retrieves information about the entities in the artifacts. In many embodiments, block 508 can detect changes based on the incremental version number of the binary and binary tags.

In several embodiments, method 500 can include a block 520 of using the cloud services to store versions of artifacts.

Figure 6:
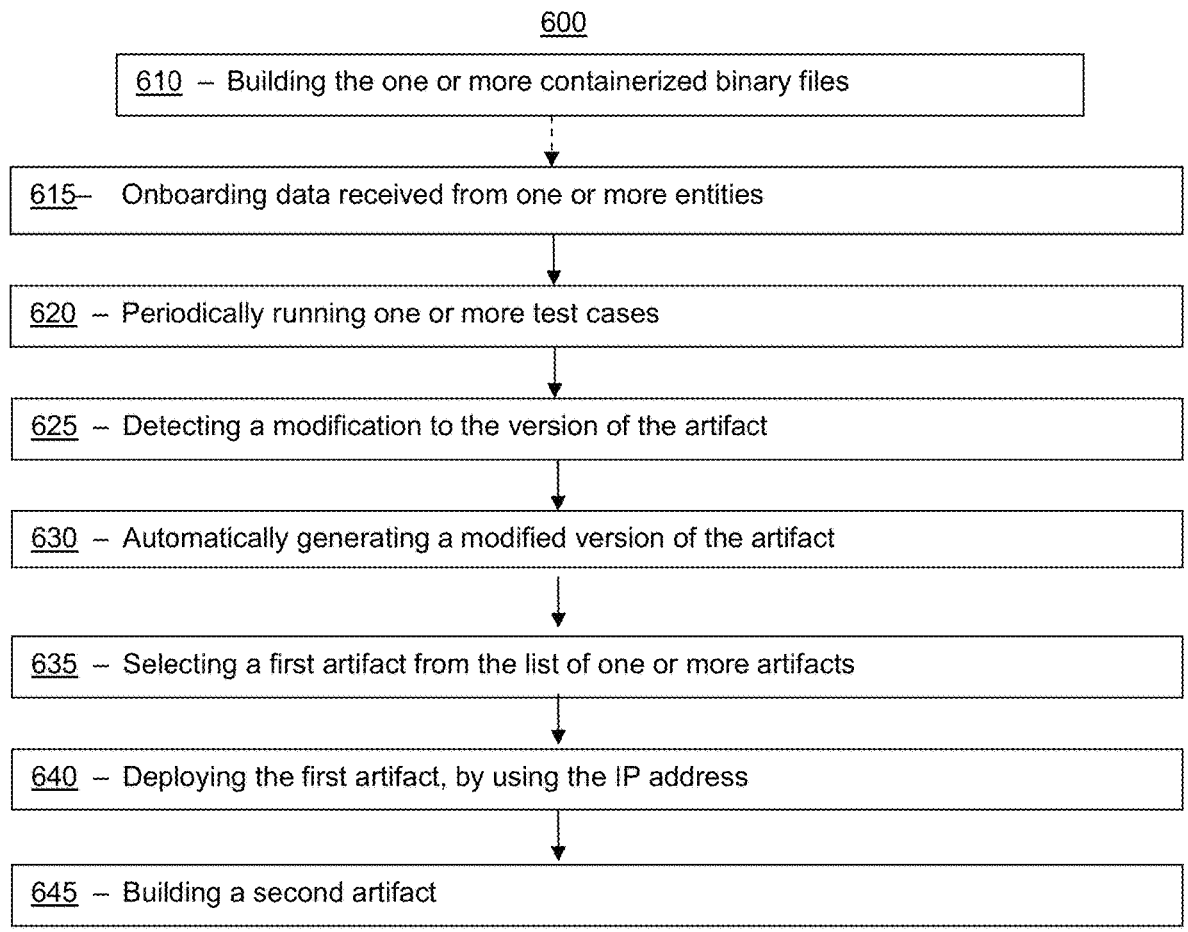
FIG. 6 illustrates a flow chart of a method, according to yet another embodiment.

Turning ahead in the drawings, FIG. 6 illustrates a flow chart for a method 600, according to another embodiment. In many embodiments, method 600 can be a method of creating an artifact of a distributed architecture system to deploy the artifact into a networking sandbox. In some embodiments, method 600 further can be a method of upon detecting a modification to the artifact, automatically generating a modified version of the artifact. Method 600 is merely exemplary and is not limited to the embodiments presented herein. Method 600 can be employed in many different embodiments and/or examples not specifically depicted or described herein. In some embodiments, the procedures, the processes, and/or the activities of method 600 can be performed in the order presented. In other embodiments, the procedures, the processes, and/or the activities of method 600 can be performed in any suitable order. In still other embodiments, one or more of the procedures, the processes, and/or the activities of method 600 can be combined or skipped. In several embodiments, system 300 (FIG. 3) can be suitable to perform method 600 and/or one or more of the activities of method 600.

In these or other embodiments, one or more of the activities of method 600 can be implemented as one or more computing instructions configured to run at one or more processors and configured to be stored at one or more non-transitory computer-readable media. Such non-transitory computer-readable media can be part of a computer system such as distributed architecture system 310 and/or web server 320. The processor(s) can be similar or identical to the processor(s) described above with respect to computer system 100 (FIG. 1).

Referring to FIG. 6, method 600 optionally can include a block 610 of building the one or more containerized binary files from the data received from the one or more entities by using docker images and runtime binaries. Block 610 can be similar or identical to the activities described in block 402 (FIG. 4) and block 504 (FIG. 5).

In various embodiments, method 600 also can include a block 615 of onboarding data received from one or more entities to create a version of an artifact of a first distributed architecture. In some embodiments, block 615 further can include data containerized in one or more containerized binary files Block 615 can be similar or identical to the activities described in block 402 (FIG. 4) and block 504 (FIG. 5).

In some embodiments, block 615 further can creating a blueprint of a function of the first distributed architecture based on the data from the one or more containerized binary files, such as described above in connection with block 404 (FIG. 4) and/or block 504 (FIG. 5). In many embodiments, the function can include the particular objective of one or more objectives, such as described above in connection with blocks 403-404 (FIG. 4) and/or block 504 (FIG. 5). In various embodiments, block 615 can include defining a group of microservices within a supporting ecosystem as defined in the blueprint, such as described above in connection with block 402 (FIG. 4) and/or blocks 504, 507, and/or 509-513 (FIG. 5). In many embodiments, block 615 additionally can include designing, using a graphical user interface, a template of systems of the first artifact based on historical artifacts, such as described above in connection with block 404 (FIG. 4) and/or block 505 (FIG. 5).

In some embodiments, method 600 can include a block 620 of periodically running one or more test cases using the version of the artifact in an environment. Block 620 can be similar or identical to the activities described in blocks 410-412 (FIG. 4) and block 502 (FIG. 5). In various embodiments, block 620 also can include using a feedback loop while running the one or more test cases to determine whether the version of the artifact is valid at a particular time period, such as described above in connection with block 412 (FIG. 4) and/or block 508 (FIG. 5). In several embodiments, block 620 further can include tracking each entity of the one or more entities, using a syncronization engine, to identify respective changes implemented by each entity to the version of the artifact.

In several embodiments, block 620 also can optionally include retrieving information from each of the one or more entities associated with the version of the artifact based on a predetermined range of time, such as described above in connection with block 402 (FIG. 4) and/or blocks 507 and 509-513 (FIG. 5). In some embodiments, the information can be obtained from one or more source repositories, such as described above in connection with block 408 (FIG. 4) and/or block 505 (FIG. 5). In some embodiments, block 620 additionally can include detecting one or more changes from (i) each version of each containerized binary file (e.g., a binary) of the one or more containerized binary files (e.g., binaries, when there are at least two containerized binary files) and (ii) binary tags (e.g., containerized binary file tags). In many embodiments, each of the binaries can be tagged with labels that capture (i) a snapshot of the version and (ii) a version number of the binary. In some embodiments, the binary tag can indicate whether the binary is a temporary binary created for testing or a binary released to production, such as described above in connection with block 412 (FIG. 4) and/or block 508 (FIG. 5).

In many embodiments, method 600 further can include a block 625 of detecting a modification to the version of the artifact. Block 625 can be similar or identical to the activities described in blocks 412 (FIG. 4) and block 502 (FIG. 5). In some embodiments, block 625 also includes storing metadata for the version of the artifact by tracking an update to the metadata generated from an incremental release of a newer version of the artifact associated with an entity of the one or more entities, such as described above in connection with block 412 (FIG. 4) and/or blocks 508 (FIG. 5). In several embodiments, block 625 further includes using the metadata, as stored, of the version of the artifact to detect the modification to the version of the artifact, such as described above in connection with block 412 (FIG. 4) and/or blocks 508 (FIG. 5).

In response to detecting the modification, in many embodiments, method 600 further can include a block 630 of automatically generating a modified version of the artifact incorporating the modification, wherein a list of one or more artifacts comprises the modified version of the artifact. Block 630 can be similar or identical to the activities described in blocks 401 (FIG. 4) and block 508 (FIG. 5).

In some embodiments, method 600 further can include a block 635 of selecting a first artifact from the list of one or more artifacts associated with the first distributed architecture. Block 635 can be similar or identical to the activities described in blocks 405 (FIG. 4) and block 506 (FIG. 5). In several embodiments, the first artifact can include an internet protocol (IP) address, such as described above in connection with block 404 (FIG. 4) and/or blocks 506 (FIG. 5). In various embodiments, the IP address can include a snapshot of the first artifact at a given period of time, such as described above in connection with block 404 (FIG. 4) and/or blocks 505 (FIG. 5).

In several embodiments, method 600 also can include a block 640 of deploying the first artifact, by using the IP address, into a networking sandbox to implement changes to the first artifact corresponding to a particular objective. Block 640 can be similar or identical to the activities described in block 405 (FIG. 4) and block 506 (FIG. 5). In various embodiments, block 640 of deploying the first artifact can additionally include using a single click to retrieve one or more applications to implement a process associated with the first artifact, such as described above in connection with block 405 (FIG. 4) and/or blocks 506 (FIG. 5).

In some embodiments, method 600 further can include a block 645 of building a second artifact based on the changes implemented to the first artifact. Block 645 can be similar or identical to the activities described in block 405 (FIG. 4) and block 506 (FIG. 5).

Turning back to the drawings, FIG. 3 illustrates a block diagram of distributed architecture system 310. Distributed architecture system 310 is merely exemplary and is not limited to the embodiments presented herein. Distributed architecture system 310 can be employed in many different embodiments or examples not specifically depicted or described herein. In some embodiments, certain elements or systems of distributed architecture system 310 can perform various procedures, processes, and/or acts. In other embodiments, the procedures, processes, and/or acts can be performed by other suitable elements or systems. In many embodiments, the systems of distributed architecture system 310 can be modules of computing instructions (e.g., software modules) stored at non-transitory computer readable media. In other embodiments, the systems of distributed architecture system 310 can be implemented in hardware.

In many embodiments, communication system 311 can at least partially perform block 401 (FIG. 4) of collecting data from one or more applications associated with a process or a function, block 410 (FIG. 4) of onboarding modified components from an incremental release, block 411 (FIG. 4) of triggering a plug in, block 501 (FIG. 5) of defining a service, block 502 (FIG. 5) of testing a service, block 503

(FIG. 5) of using a graphical user interface to define the architecture, block 507 (FIG. 5) of discovering historical artifacts, block 508 (FIG. 8) of synchronizing with the artifacts and the entities, and/or block 615 (FIG. 6) of onboarding data received from one or more entities to create a version of an artifact of a first distributed architecture.

In several embodiments, deploying system 312 can at least partially perform block 405 (FIG. 4) of deploying a selected artifact, block 413 (FIG. 4) of building a second artifact based on the changes implemented to the first artifact, block 506 (FIG. 5) of deploying a blueprint and IP address, block 520 (FIG. 5) of using the cloud services to store versions of artifacts, block 635 (FIG. 6) of selecting a first artifact from the list of one or more artifacts associated with the first distributed architecture, and/or block 640 (FIG. 6) of deploying the first artifact, by using the IP address, into a networking sandbox to implement changes to the first artifact corresponding to a particular objective.

In many embodiments, building system 313 can at least partially perform block 404 (FIG. 4) of building the artifact, block 407 (FIG. 4) of receiving system designs using a looper to build artifacts for storage, block 408 (FIG. 4) of storing artifacts in a respository, block 504 (FIG. 5) of creating a blueprint of the architecture, block 505 (FIG. 5) of storing a blueprint in a repository, and/or block 645 (FIG. 6) of building a second artifact based on the changes implemented to the first artifact.

In some embodiments, generating system 314 can at least partially perform block 402 (FIG. 4) of collecting data from applications, block 403 (FIG. 4) of designing a system, and/or block 406 (FIG. 4) of storing data used to build an artifact.

In various embodiments, containerized system 315 can at least partially perform block 610 (FIG. 6) building the one or more containerized binary files from the data received from the one or more entities by using docker images and runtime binaries.

In some embodiments, modifying system 316 can at least partially perform block 412 (FIG. 4) of running end-to end testing to track each entity, block 620 (FIG. 6) of periodically running one or more test cases using the version of the artifact in an environment, block 625 (FIG. 6) of detecting a modification to the version of the artifact, and/or block 630 (FIG. 6) of automatically generating a modified version of the artifact incorporating the modification.

In several embodiments, web server 320 can at least partially perform sending instructions to user computers (e.g., 350-351 (FIG. 3)) based on information received from communication system 311.

In several embodiments, the operation of the system can provide several technical advantages over conventional methods of deploying distributed architecture systems, including but not limited to:
(a) keeping the architecture of the process and/or function current or up-to-date;
(b) deploying the process on-demand using a dedicated namespace;
(c) retrieving or shutting down a deployment instantly in real-time; and/or
(d) scaling the microservices based on demand.

In several embodiments, modifying the systems deployed in a secluded environment (e.g., a network sandbox) provides several technical advantages including allow specific external network calls. Such an advantage can greatly help in simulation as the developer does not have to be concerned about affecting existing systems or additional configurations.

In some embodiments, using the deploying process can provide several technical advantages to the computer system such that deploying artifacts can be conducted using (i) a scaled down mode for development or testing purposes and (ii) a scaled up mode for production purpose. For example, databases, such as a shared Cassandra or Kafka resources, can be used in a scaled down mode, however, individual instances can be running in a production mode.

In various embodiments, another advantage of the system can be illustrated by improving dependency resolution when the system automatically handles the startup order hierarchy across systems based on the architecture design.

In some embodiments, the system can automatically group multiple versions of a same system, such as Cassandra 2.0 and 3.0 in development mode, based on the version and route traffic from applications to respective instances.

In several embodiments, microservices can use any domain or IP address which is valid within the deployed namespace. Such an advantage helps to give a new domain name system (DNS) for microservices and existing other services to run with a same production/stage DNS without changes.

In various embodiments, dependent systems can either be mocked by built-in mock support or a whitelist to connect to the external services by design. In some embodiments, the system can support both (i) virtual machine (VM) applications and (ii) container native apps by automatically containerizing the legacy VM applications to help the legacy VM applications in the journey while migrating to cloud services.

In some embodiments, using the Sync feature (e.g., synchronizing engine) can advantageously keep systems up-to-date. Such systems can include a one ops release or Cassandra schema changes. In several embodiments, the system advantageously conducts automatic network trace logging.

In many embodiments, an architect using distributed architecture system 310 (FIG. 3) to build and deploy artifacts of such systems can show an improvement over the conventional method as follows:
(a) using application lifecycle management platforms to configure and deploy the individual microservice binaries to the virtual machine (VM);
(b) using cloud native platforms to deploy containerized artifacts to the public cloud service;
(c) using separate processes to instantiate or provision microservice supporting ecosytems, such as data bases (DB), message brokers, and/or another suitable ecosystem;
(d) although rarely implemented due to the complexity and effort, manually retrieving each service and stringing together a function for deployment; or
(e) collecting each configuration and/or schema data individually where such configurations and/or schemas can be located or scattered across the various systems, and/or another suitable conventional technique.

In a number of embodiments, the techniques described herein can solve a technical problem that arises only within the realm of computer networks, as determining whether an artifact is up-to-date or not does not exist outside the realm of computer networks. Moreover, the techniques described herein can solve a technical problem that cannot be solved outside the context of computer networks. Specifically, the techniques described herein cannot be used outside the context of computer networks, in view of a lack of data, and because an integrated platform that is part of the techniques described herein would not exist.

Various embodiments can include a system including one or more processors and one or more non-transitory computer-readable media storing computing instructions configured to run on the one or more processors and perform certain acts. The acts can include onboarding data received from one or more entities to create a version of an artifact of a first distributed architecture. The data can be containerized in one or more containerized binary files. The acts also can include periodically running one or more test cases using the version of the artifact in an environment. The acts further can include detecting a modification to the version of the artifact. In response to detecting the modification, the acts additionally can include automatically generating a modified version of the artifact incorporating the modification. The list of one or more artifacts can include the modified version of the artifact. The acts also can include selecting a first artifact from the list of one or more artifacts associated with the first distributed architecture. The first artifact can include an internet protocol (IP) address. The acts further can include deploying the first artifact, by using the IP address, into a networking sandbox to implement changes to the first artifact corresponding to a particular objective. The acts also can include building a second artifact based on the changes implemented to the first artifact.

A number of embodiments can include a method being implemented via execution of computing instructions configured to run at one or more processors and stored at one or more non-transitory computer-readable media. The method can include onboarding data received from one or more entities to create a version of an artifact of a first distributed architecture. The data can be containerized in one or more containerized binary files. The method also can include periodically running one or more test cases using the version of the artifact in an environment. The method further can include detecting a modification to the version of the artifact. In response to detecting the modification, the method additionally can include automatically generating a modified version of the artifact incorporating the modification. The list of one or more artifacts can include the modified version of the artifact. The method also can include selecting a first artifact from the list of one or more artifacts associated with the first distributed architecture. The first artifact can include an internet protocol (IP) address. The method further can include deploying the first artifact, by using the IP address, into a networking sandbox to implement changes to the first artifact corresponding to a particular objective. The method also can include building a second artifact based on the changes implemented to the first artifact.

Although deploying a current version of an artifact in a secluded environment has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIGS. 3-6 may include different procedures, processes, and/or activities and be performed by many different modules, in many different orders, and/or one or more of the procedures, processes, or activities of FIGS. 3-6 may include one or more of the procedures, processes, or activities of another different one of FIGS. 3-6. As another example, the systems within distributed architecture system 310 and/or web server 320 can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions that, when executed on the one or more processors, cause the one or more processors to perform operations comprising:
onboarding data received from one or more entities to create a version of an artifact of a first distributed architecture, wherein the data is containerized in one or more containerized binary files;
periodically running one or more test cases using the version of the artifact in an environment;
detecting a modification to the version of the artifact, wherein detecting the modification to the version of the artifact comprises storing metadata for the version of the artifact by tracking an update to the metadata generated from an incremental release of a newer version of the artifact associated with an entity of the one or more entities;
in response to detecting the modification, automatically generating a modified version of the artifact incorporating the modification, wherein a list of one or more artifacts comprises the modified version of the artifact;
selecting a first artifact from the list of one or more artifacts associated with the first distributed architecture, wherein the first artifact comprises an internet protocol (IP) address;
deploying the first artifact, by using the IP address, into a networking sandbox to implement changes to the first artifact corresponding to a particular objective; and
building a second artifact based on the changes implemented to the first artifact.

2. The system of claim 1, wherein the computing instructions, when executed on the one or more processors, further cause the one or more processors to perform an operation comprising, before onboarding the data and before creating the version of the artifact:
building the one or more containerized binary files from the data received from the one or more entities by using docker images and runtime binaries.

3. The system of claim 1, wherein creating the version of the artifact further comprises:

creating a blueprint of a function of the first distributed architecture based on the data from the one or more containerized binary files, wherein the function comprises the particular objective of one or more objectives; and defining a group of microservices within a supporting ecosystem as defined in the blueprint.

4. The system of claim 1, wherein creating the version of the artifact further comprises:
designing, using a graphical user interface, a template of systems of the first artifact based on historical artifacts.

5. The system of claim 1, wherein periodically running the one or more test cases using the version of the artifact further comprises:
using a feedback loop while running the one or more test cases to determine whether the version of the artifact is valid at a particular time period.

6. The system of claim 1, wherein periodically running the one or more test cases using the version of the artifact further comprises:
tracking each entity of the one or more entities, using a synchronization engine, to identify respective changes implemented by each entity to the version of the artifact.

7. The system of claim 6, wherein:
using the synchronization engine comprises:
retrieving information from each of the one or more entities associated with the version of the artifact based on a predetermined range of time, wherein the information is obtained from one or more source repositories; and
detecting one or more changes from (i) each version of each containerized binary file of the one or more containerized binary files and (ii) binary tags associated with a respective entity of the one or more entities.

8. The system of claim 1, wherein detecting the modification to the version of the artifact further comprises:
using the metadata, as stored, of the version of the artifact to detect the modification to the version of the artifact.

9. The system of claim 1, wherein the IP address comprises a snapshot of the first artifact at a given period of time.

10. The system of claim 1, wherein deploying the first artifact comprises:
using a single click to retrieve one or more applications to implement a process associated with the first artifact.

11. A method being implemented via execution of computing instructions configured to run on one or more processors and stored at one or more non-transitory computer-readable media, the method comprising:
onboarding data received from one or more entities to create a version of an artifact of a first distributed architecture, wherein the data is containerized in one or more containerized binary files;
periodically running one or more test cases using the version of the artifact in an environment;
detecting a modification to the version of the artifact, wherein detecting the modification to the version of the artifact comprises storing metadata for the version of the artifact by tracking an update to the metadata generated from an incremental release of a newer version of the artifact associated with an entity of the one or more entities;
in response to detecting the modification, automatically generating a modified version of the artifact incorporating the modification, wherein a list of one or more artifacts comprises the modified version of the artifact;

selecting a first artifact from the list of one or more artifacts associated with the first distributed architecture, wherein the first artifact comprises an internet protocol (IP) address;
deploying the first artifact, by using the IP address, into a networking sandbox to implement changes to the first artifact corresponding to a particular objective; and
building a second artifact based on the changes implemented to the first artifact.

12. The method of claim 11 further comprising, before onboarding the data and before creating the version of the artifact:
building the one or more containerized binary files from the data received from the one or more entities by using docker images and runtime binaries.

13. The method of claim 11, wherein creating the version of the artifact further comprises:
creating a blueprint of a function of the first distributed architecture based on the data from the one or more containerized binary files, wherein the function comprises the particular objective of one or more objectives; and
defining a group of microservices within a supporting ecosystem as defined in the blueprint.

14. The method of claim 11, wherein creating the version of the artifact further comprises:
designing, using a graphical user interface, a template of systems of the first artifact based on historical artifacts.

15. The method of claim 11, wherein periodically running the one or more test cases using the version of the artifact further comprises:
using a feedback loop while running the one or more test cases to determine whether the version of the artifact is valid at a particular time period.

16. The method of claim 11, wherein periodically running the one or more test cases using the version of the artifact further comprises:
tracking each entity of the one or more entities, using a synchronization engine, to identify respective changes implemented by each entity to the version of the artifact.

17. The method of claim 16, wherein:
using the synchronization engine comprises:
retrieving information from each of the one or more entities associated with the version of the artifact based on a predetermined range of time, wherein the information is obtained from one or more source repositories; and
detecting one or more changes from (i) each version of each binary containerized file of the one or more containerized binary files and (ii) binary tags associated with a respective entity of the one or more entities.

18. The method of claim 11, wherein detecting the modification to the version of the artifact further comprises:
using the metadata, as stored, of the version of the artifact to detect the modification to the version of the artifact.

19. The method of claim 11, wherein the IP address comprises a snapshot of the first artifact at a given period of time.

20. The method of claim 11, wherein deploying the first artifact comprises:
using a single click to retrieve one or more applications to implement a process associated with the first artifact.

* * * * *